United States Patent
Hemmings et al.

(10) Patent No.: US 6,695,902 B2
(45) Date of Patent: Feb. 24, 2004

(54) ASPHALT COMPOSITES INCLUDING FLY ASH FILLERS OR FILLER BLENDS, METHODS OF MAKING SAME, AND METHODS FOR SELECTING OR MODIFYING A FLY ASH FILLER FOR USE IN ASPHALT COMPOSITES

(75) Inventors: Raymond T. Hemmings, Kennesaw, GA (US); Russell L. Hill, San Antonio, TX (US); Bruce J. Cornelius, Waterdown (CA); Aron McBay, San Antonio, TX (US)

(73) Assignee: Boral Material Technologies, Inc., San Antonio, TX (US)

( * ) Notice: Subject to any disclaimer, the term of this patent is extended or adjusted under 35 U.S.C. 154(b) by 241 days.

(21) Appl. No.: 09/993,316

(22) Filed: Nov. 14, 2001

(65) Prior Publication Data

US 2002/0124775 A1 Sep. 12, 2002

Related U.S. Application Data

(60) Provisional application No. 60/248,518, filed on Nov. 14, 2000.

(51) Int. Cl.[7] .......................... C09D 195/00; C09L 3/00; C08K 13/00; C08K 3/36; C08K 3/26
(52) U.S. Cl. .................. 106/284.05; 106/405; 106/464; 106/465; 106/472; 106/DIG. 1
(58) Field of Search ............................ 106/284.05, 405, 106/464, 465, 472, DIG. 1

(56) References Cited

U.S. PATENT DOCUMENTS

| | | |
|---|---|---|
| 3,769,053 A | 10/1973 | Pennachetti et al. |
| 3,769,054 A | 10/1973 | Pennachetti et al. |
| 3,991,005 A | 11/1976 | Wallace |
| 4,013,616 A | 3/1977 | Wallace |
| 4,121,945 A | 10/1978 | Hurst et al. |
| 4,268,320 A | 5/1981 | Klingaman et al. |
| 4,294,750 A | 10/1981 | Klingaman et al. |
| 4,486,211 A | 12/1984 | Monaghan |
| 4,490,493 A | 12/1984 | Mikols |
| 4,661,533 A | 4/1987 | Stobby |
| 4,705,409 A | 11/1987 | Trerice |
| 4,714,722 A | 12/1987 | Najvar et al. |
| 4,992,102 A | 2/1991 | Barbour |
| 5,087,545 A | 2/1992 | Hagenbach |
| 5,160,539 A | 11/1992 | Cochran |
| 5,299,692 A | 4/1994 | Nelson et al. |
| 5,302,634 A | 4/1994 | Mushovic |
| 5,391,417 A | 2/1995 | Pike |
| 5,399,194 A | 3/1995 | Cochran et al. |
| 5,536,310 A | 7/1996 | Brook et al. |
| 5,565,239 A | 10/1996 | Pike |
| 5,624,491 A | 4/1997 | Liskowitz et al. |
| 5,681,384 A | 10/1997 | Liskowitz et al. |
| 5,772,752 A | 6/1998 | Liskowitz et al. |
| 5,776,244 A | 7/1998 | Ahrens |
| 5,814,256 A | 9/1998 | Greve et al. |
| 5,817,230 A | 10/1998 | Groppo, Jr. et al. |
| 5,845,783 A | 12/1998 | Smith |
| 5,849,075 A | 12/1998 | Hopkins et al. |
| 5,882,396 A * | 3/1999 | Hiorns ........................ 106/464 |
| 5,887,724 A | 3/1999 | Weyand et al. |
| 5,935,885 A | 8/1999 | Hnat et al. |
| 6,096,401 A | 8/2000 | Jenkines |
| 6,139,960 A | 10/2000 | Styron et al. |
| 6,242,098 B1 | 6/2001 | Styron et al. |

FOREIGN PATENT DOCUMENTS

| | | |
|---|---|---|
| DD | 292 008 | 7/1991 |
| EP | 0 103 175 | 3/1984 |
| EP | 0-310-539 A3 | 4/1989 |
| EP | 0 310 539 A2 | 4/1989 |
| JP | 4-346884 | 12/1992 |
| JP | 6-126252 | 5/1994 |
| JP | 6-307606 | 11/1994 |
| JP | 7-060142 | 3/1995 |
| JP | 9-30857 | 2/1997 |
| JP | 10-029882 | 2/1998 |
| WO | WO 95/27685 | 10/1995 |
| WO | WO 95/33571 | 12/1995 |
| WO | WO-97/21640 | 6/1997 |
| WO | WO 99/37592 | 7/1999 |

OTHER PUBLICATIONS

Huang et al., "Processed Low $NO_x$ Fly Ash as a Filler in Plastics," Proceedings of Twelfth International Symposium on Management & Use of Coal Combustion Byproducts (CCBs),(Jan. 26–30, 1997), Orlando, Florida, USA.

Berry, E. E., et al., "Beneficiated Fly Ash: Hydration, Microstructure, and Strength Development in Portland Cement Systems," Fly Ash, Silica Fume, Slag, and Natural Pozzolans in Concrete, Proceedings Third International Conference, Trondheim, Norway, 1989;, no month provided vol. 1; American Concrete Institute, Detroit.

(List continued on next page.)

*Primary Examiner*—David Brunsman
(74) *Attorney, Agent, or Firm*—Alston & Bird LLP

(57) ABSTRACT

The present invention is a fly ash filler or filler blend having a particle size distribution with at least three modes that when combined with asphalt produces asphalt composites such as roofing shingles with improved mechanical properties at a lower cost than asphalt shingles produced using conventional calcium carbonate fillers. The present invention also includes a method for producing an asphalt composite, comprising the steps of combining asphalt with a fly ash filler or a filler blend having a particle size distribution with at least three modes and producing an asphalt composite with the resulting filled asphalt. The present invention further includes a method of determining what fly ashes can be used as fillers for asphalt composites such as roofing shingles. The fly ash filler or filler blend can be used in amounts of greater than 45% by volume or greater than 70% by weight to increase the mechanical properties of the asphalt composites such as the pliability, tensile strength and tear strength while decreasing the cost to produce the asphalt composites.

66 Claims, No Drawings

OTHER PUBLICATIONS

Yih et al., "Recovery of Cenospheres and Application to the Manufacture of Insulation Materials," *Journal of the Chin-.I.Ch.E.*, vol. 19, No. 1, 1988, no month provided pp. 23–29.

G. Dinelli, "Thermal By–Products Treatment and Valorization," *Chemicke Listy*, vol. 89, No. 3,(Mar. 1995), pp. 137–143.

"Fly Ash Shows Promise as Plastics Filler," C&EN,(May 8, 1978), pp. 29–30.

Roger L. Kaas, "Residual Fly Ash Can Replace Talc and Kaolin as Polypropylene Filler," *Plastics Design & Processing*,(Nov. 1978), pp. 49–53.

G. J. Jablonski, "Fly Ash Utilization as an Extender in Plastics and Paints," International Ash Utilization Symposium,(Oct. 1987), pp. 38.1–38.15.

Borrachero, P.J. et al., "Improvement of Portland Cement/ Fly Ash Mortars Strength Using Classified Fly Ashes," Proceedings of the International Conference on Environmental Implications of Construction with Waste Materials, vol. 2, 1994, no month provided pp. 563–570.

Ukita, K. et al., "Properties of High Strength Concrete Using 'Classified Fly Ash'," $4^{th}$ International Conference on Fly Ash, Silica Fume, Slag and Natural Pozzolans in Concrete, (May, 1992), pp. 37–47.

Berry, E.E., et al., "Enhanced Resource Recovery by Beneficiation and Direct Acid Leaching of Fly Ash<" Fly Ash and Coal Conversion By–Products: Characterization, Utilization and Disposal III Symposium held(Dec. 1–3, 1986), Boston, MA, pp. 365–380.

Abstract: Shaw, Donald E., "The Use of Fly Ash in the Manufacture of Asphalt Shingles,"(Jun. 2002,) pp. 1–13.

Berry, E.E., et al., "Acid–Leached Fly Ash as a Spherical Filler in Polymer Composites," $42^{nd}$ Annual Conference, Composites Institute, The Society of the Plastics Industry, Inc. (Feb. 2–6,1987).

Hemmings, R.T., et al., "Evaluation of Plastic Filler Applications for Leached Fly Ash," Electric Power Research Institute;(Sep. 1986,)Ontario Research Foundation, Mississauga, Ontario, Canada.

Plowman, C., et al.; "The Use of Pulverized Fuel Ash as a Filler in Plastics," Conference Proceedings for the AshTech '84 Second International Conference on Ash Technology and Marketing, Barbican Centre, London, (Sep. 16–21, 1984), pp. 663–670.

Monzó, J. Payá, et al., "Early–Strength Development of Portland Cement Mortars Containing Air Classified Fly Ashes," Cement and Concrete Research, 1995, no month provided pp. 449–456, vol. 25, No. 2, Elsevier Science Ltd., United States of America.

"Chinese to make fly ash microspheres," Modern Plastics International,(Oct. 1986), p. 19.

* cited by examiner

ASPHALT COMPOSITES INCLUDING FLY ASH FILLERS OR FILLER BLENDS, METHODS OF MAKING SAME, AND METHODS FOR SELECTING OR MODIFYING A FLY ASH FILLER FOR USE IN ASPHALT COMPOSITES

CROSS REFERENCE TO RELATED APPLICATIONS

This application is related to commonly owned, provisional application Ser. No. 60/248,518, filed Nov. 14, 2000, and claims the benefit of the earlier filing date of this application under 35 U.S.C. §119(e).

FIELD OF THE INVENTION

The present invention relates generally to fillers for asphalt composites such as roofing shingles, and more particularly relates to fly ash filler and filler blends for use in asphalt compositions and to methods for selecting or modifying a fly ash filler or filler blend for use in asphalt composites.

BACKGROUND OF THE INVENTION

Asphalt shingle manufacturing plants typically utilize a mineral filler, or extender, both to impart desired mechanical properties to the shingles and to reduce raw material costs. The mineral filler typically used for this purpose is a fine particulate inorganic material, commonly produced from ground limestone or calcium carbonate, and is typically used at filler loadings of 60–65% by weight of the asphalt composite. The principal role of the filler in this application is to extend the more costly asphalt to improve the economics of the process, while at the same time stabilizing and stiffening the asphalt matrix to improve its resistance to extreme heat and weathering.

As an alternative to calcium carbonate, U.S. Pat. No. 5,565,239 to Pike entitled "Method of Making Asphaltic Roofing Material Containing Class F Fly Ash Filler" describes the use of Class F fly ash as a filler for asphalt roofing materials. The patent discusses a number of disadvantages associated with using calcium carbonate and a number of advantages associated with using fly ash as a filler in asphalt shingles. Although some Class F fly ashes could be used as fillers for asphalt shingles, many fly ashes that meet Class F specifications cannot be used with asphalt at loadings of 60–65% by weight to produce a composite that meets industry standards. Therefore, there is a need in the art to better determine what fly ashes can indeed be used as fillers with asphalt shingles. Furthermore, there is a need in the art to increase the filler loadings for asphalt shingles to increase the mechanical properties of the shingles such as the pliability, tensile strength and tear strength and to decrease cost.

SUMMARY OF THE INVENTION

The present invention provides a method for determining what fly ashes can be used as fillers for asphalt composites such as roofing shingles. In addition, the invention provides a fly ash filler or filler blend that can used in amounts of greater than 45% by volume and 70% by weight to increase mechanical properties of the asphalt composites such as pliability, tensile strength and tear strength while reducing the cost to produce the asphalt composites.

In accordance with the invention, the inventors have discovered that the granulometry of the fly ash used as a filler or in filler blends for asphalt composites such as roofing shingles is important to the rheological performance of the filled asphalt in the production of the asphalt composites and to the mechanical properties of the resulting asphalt composites. In one embodiment, the asphalt composite includes asphalt and a filler, the filler comprising a blend of fly ash and at least one other filler wherein the filler blend has a particle size distribution having at least three modes and typically having three modes. Preferably, the particle size distribution includes a first mode having a median particle diameter from 0.3 to 1.0 microns, a second mode having a median particle diameter from 10 to 25 microns, and a third mode having a median particle diameter from 40 to 80 microns. The particle size distribution also preferably includes 11–17% of the particles by volume in the first mode, 56–74% of the particles by volume in the second mode, and 12–31% of the particles by volume in the third mode. Moreover, the ratio of the volume of particles in the second and third modes to the volume of particles in the first mode is preferably from about 4.5 to about 7.5. The fly ash can, for example, be a lignite coal fly ash or a subbituminous coal fly ash. The fly ash can also have a carbon content of from 1% to 5% by weight. In one preferred embodiment, the at least one additional filler in the filler blend is a second fly ash. For this embodiment, the filler blend preferably comprises a high fine particle content fly ash filler (e.g. having a median particle size of 10 microns or less) and a low fine particle content fly ash filler (e.g. having a median particle size of 20 microns or greater). Alternatively, the at least one additional filler in the filler blend can be a calcium carbonate filler. In this particular embodiment, the fly ash is preferably a high fine content fly ash. The filler blend can include from about 10% to about 90% by weight of the fly ash filler and from about 90% to about 10% by weight of the calcium carbonate filler. The filler blend preferably has a packing factor of at least 65% and can be loaded in the asphalt composite at a filler loading of greater than 45% by volume or at a filler loading of greater than 70% by weight. The present invention further includes a filler for asphalt composites comprising fly ash and at least one additional filler and having the properties discussed above.

The present invention also includes a method for producing an asphalt composite, comprising combining asphalt with a fly ash and at least one additional filler such that the fly ash and the at least one additional filler together produce a filler blend having a particle size distribution with at least three modes and producing an asphalt composite with the resulting filled asphalt. Preferably, the method includes the step of blending the fly ash and the at least one additional filler together to produce a filler blend prior to the combining step. Alternatively, a fly ash blend formed by burning two or more types of coal selected from the group consisting of lignite coal, subbituminous coal and bituminous coal can be used to form the asphalt composite. The filler blends can include the fillers and the filler properties described in the previous paragraph. Preferably, the fly ash and the at least one additional filler can be combined with the asphalt to produce a viscosity of 6000 centipoise (cps) or less at 400° F. when the fly ash filler is present in an amount of at least 45% by volume, at least 65% by weight, or even at least 70% by weight. The asphalt, fly ash and the at least one additional filler can also be combined with carbon to produce the asphalt composite. The fly ash used in the filler blend can be air classified to produce the fly ash filler for use in the filler blend. For example, a high fine particle content fly ash or a high coarse particle content fly ash can be air classified for use in the filler blend.

In another embodiment of the invention, the present invention comprises an asphalt composite comprising asphalt and a subbituminous coal fly ash filler, wherein the subbituminous coal fly ash filler has a particle size distribution having at least three modes and typically includes three modes. Preferably, the particle size distribution includes a first mode having a median particle diameter from 0.3 to 1.0 microns, a second mode having a median particle diameter from 10 to 25 microns, and a third mode having a median particle diameter from 40 to 80 microns. The particle size distribution also preferably includes 11–17% of the particles by volume in the first mode, 56–74% of the particles by volume in the second mode, and 12–31% of the particles by volume in the third mode. Moreover, the ratio of the volume of particles in the second and third modes to the volume of particles in the first mode is preferably from about 4.5 to about 7.5. The fly ash filler preferably has a packing factor of at least 65% and can be loaded in the asphalt composite at a filler loading of greater than 45% by volume or at a filler loading of greater than 70% by weight. Moreover, the subbituminous coal fly ash is typically a Class C fly ash. The present invention further includes a subbituminous coal fly ash filler for asphalt composites having the properties discussed above.

The present invention also includes a method for producing an asphalt composite, comprising the steps of combining asphalt with a subbituminous coal fly ash filler having a particle size distribution with at least three modes and producing an asphalt composite with the resulting filled asphalt. The subbituminous coal fly ash filler can have the properties discussed above. Preferably, the subbituminous coal fly ash filler can be combined with the asphalt to produce a viscosity of 6000 centipoise or less at 400° F. when the fly ash filler is present in an amount of at least 45% by volume, at least 65% by weight, or even at least 70% by weight. The subbituminous coal fly ash can also be air classified to produce a fly ash filler having a particle size distribution having at least three modes. The subbituminous coal fly ash filler and asphalt can also be combined with carbon to produce the asphalt composite.

Moreover, the present invention includes an asphalt composite comprising asphalt and a filler at a loading of greater than 70% by weight, the filler comprising fly ash and having a particle size distribution with at least three modes and typically having three modes. The filler in the asphalt composite preferably has a particle size distribution such as described above. The fly ash can be a lignite coal fly ash or a subbituminous coal fly ash, and the asphalt composite can further include an additional filler such as a second fly ash or calcium carbonate. The present invention also includes a method for producing an asphalt composite, comprising the steps of combining asphalt and a filler at a loading of greater than 70% by weight, the filler comprising fly ash and having a particle size distribution with at least three modes, and producing an asphalt composite with the resulting filled asphalt.

The present invention further includes an asphalt composite comprising asphalt, a filler and a primarily carbon-containing material. The filler preferably has a particle size distribution with at least three modes and typically has three modes. More preferably, the filler has a particle size distribution such as described above. The filler can include a fly ash such as a lignite coal fly ash or a subbituminous coal fly ash, and can further include an additional filler such as a second fly ash or calcium carbonate. Alternatively, the filler can be calcium carbonate. The primarily carbon-containing material is preferably present in the asphalt composite in an amount from about 0.1% to about 5% by weight. In addition, the present invention includes a filler blend for asphalt composites including a filler and a primarily carbon-containing material. Moreover, the present invention includes a method for producing an asphalt composite comprising the steps of combining asphalt with a filler and a primarily carbon-containing material and producing an asphalt composite with the resulting filled asphalt.

The present invention also includes an asphalt composite comprising asphalt and a calcium carbonate filler, wherein the calcium carbonate has a particle size distribution having at least three modes and typically having three modes. Moreover, the present invention includes a method for producing an asphalt composite, comprising the steps of combining asphalt with a calcium carbonate filler having a particle size distribution having at least three modes and producing an asphalt composite with the resulting filled asphalt.

In another embodiment of the invention, the present invention includes a method for producing an asphalt composite, comprising the steps of classifying a fly ash to produce a fly ash having a particle size distribution having at least three modes, combining the fly ash with asphalt to produce a filled asphalt and producing an asphalt composite with the filled asphalt. The fly ash can be classified to produce a fly ash having a particle size distribution with three modes, wherein the modes preferably include a first mode having a median particle diameter from 0.3 to 1.0 microns, a second mode having a median particle diameter from 10 to 25 microns, and a third mode having a median particle diameter from 40 to 80 microns. More preferably, the classified fly ash has a particle size distribution that includes 11–17% of the particles by volume in the first mode, 56–74% of the particles by volume in the second mode, and 12–31% of the particles by volume in the third mode. The classified fly ash also preferably has a particle size distribution wherein the ratio of the volume of particles in the second and third modes to the volume of particles in the first mode is from about 4.5 to about 7.5. Moreover, the classified fly ash preferably has a packing factor of at least 65%. The classified fly ash can be a lignite coal fly ash, a subbituminous coal fly ash, a bituminous coal fly ash or a fly ash resulting from burning two or more of these coals. The classified fly ash and at least one additional filler can be combined with asphalt to produce a filled asphalt, e.g., by blending the fly ash and the at least one additional filler together to produce a filler blend. The filler blend can include a first fly ash and a second fly ash such as a blend of a high fine particle content fly ash and a low fine particle content fly ash. Alternatively, the filler blend can include a fly ash (e.g. a high fine particle content fly ash) and a calcium carbonate. Preferably, the filler blend includes from about 10% to about 90% by weight of fly ash and from about 90% to about 10% by weight of calcium carbonate. The classified fly ash can have a carbon content of from 1% to 5% by weight or, alternatively, carbon can be combined with the classified fly ash and asphalt. The classified fly ash (and optional additional filler) preferably combine with the asphalt to produce a filled asphalt having a viscosity of 6000 centipoise or less at 400° F. at loadings of at least 45% filler by volume, at least 65% filler by weight, and even at least 70% filler by weight. The fly ash is preferably classified using an air classification method.

Furthermore, the present invention includes a method for producing an asphalt composite, comprising the step of selecting a fly ash filler for use in the asphalt composite or modifying a fly ash filler for use in the asphalt composite to have a particle size distribution with at least three modes to increase the packing factor of the fly ash filler and to improve the mechanical properties of the asphalt composite. Typically, the method comprises selecting a fly ash filler or modifying a fly ash filler to have a particle size distribution with three modes. The method can also include selecting an asphalt that has good compatibility with the fly ash filler to improve the mechanical properties of the asphalt composite. Moreover, a fly ash filler can be selected or modified to have a loss on ignition (or carbon content) within a certain desirable range to provide a desirable viscosity for the filled asphalt in processing and good pliability, tear strength and tensile strength for the asphalt composite. A fly ash filler can also be selected or modified to have a high specific gravity to increase the pliability of the asphalt composite. Further, fly ash filler can also be selected or modified to have a low oil absorption to decrease the viscosity of the filled asphalt in processing.

These and other features and advantages of the present invention will become more readily apparent to those skilled in the art upon consideration of the following detailed description, which describe both the preferred and alternative embodiments of the present invention.

DETAILED DESCRIPTION OF THE INVENTION

In the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

As discussed above, the inventors have determined that the granulometry of fly ash fillers and filler blends is the dominant factor in determining the suitability of these fillers for use as mineral fillers in asphalt composites such as roofing shingles and allows these fillers to replace the ground limestone or calcium carbonate fillers conventionally used in asphalt composites. This discovery is in marked contrast to the generic "chemical" description used in the U.S. Pat. No. 5,565,239, which classifies fly ash solely on the basis of its ASTM designation. In particular, U.S. Pat. No. 5,565,239 discusses the use of Class F fly ash fillers for asphalt shingles at a loading of 40 to 70% by weight. Although asphalt shingles filled at 40% with Class F fly ashes generally have acceptable mechanical properties, most Class F fly ash composites do not meet quality control specifications at greater than 60% by weight fly ash. Thus, U.S. Pat. No. 5,565,239 does not sufficiently describe the properties for fly ash that produce asphalt shingles having desirable performance.

As is well understood to those skilled in the art, fly ash is produced from the combustion of pulverized coal in electrical power generation plants. Fly ash is formed of mineral matter that is typically of very fine particle size, ranging from less than 1 micron to over 100 microns in some cases. The fly ash particles possess a substantially spherical shape as a consequence of the high temperature melting and coalescence in the furnace of the mineral matter accompanying the coal. The fine particle size and spherical shape are advantageous properties of the fly ash and are in marked contrast to the properties of ground limestone or calcium carbonate, which is typically relatively coarse with an irregular, blocky particle shape. These differences in granulometry between fly ash and limestone or calcium carbonate fillers are highly significant to the present invention.

Mineralogically, fly ash is predominantly amorphous, or non-crystalline, in nature as a result of the rapid quenching of clay/shale minerals as they rapidly pass through the boiler flame and dust collection system of the power plant. For some fly ashes, the amorphous material can be described as an aluminosilicate glass similar in composition to the mineral mullite ($Al_6Si_2O_{13}$); for other fly ashes, it can be described as a calcium aluminosilicate glass similar in composition to the mineral anorthite ($CaAl_2Si_2O_8$). Fly ashes also contain smaller amounts of a variety of other mineral components derived from thermal modification of accessory minerals present in the coal. These typically include mullite, quartz ($SiO_2$), ferrite spinel ($Fe_3O_4$), hematite ($Fe_2O_3$), dicalcium silicate ($Ca_2SiO_4$), tricalcium aluminate ($Ca_3SiO_5$), and lime (CaO). These mineral components occur either as inclusions in the glass particles or as discrete particles.

It is commonly known that the chemical composition of fly ash changes as a result of the type of coal being burned in the boiler. These differences are largely in the relative proportions of the element calcium present in the ash. For example, high rank bituminous coals generally have a low calcium content and produce an ash with relatively low calcium, typically less than 5% as CaO; whereas low rank thermal coals generally have much higher content of calcium, typically in the range 8–20% CaO for lignite coals and 20–30% CaO, or higher, for subbituminous coals. These differences are recognized by ASTM specifications, such as ASTM C-618 that governs the use of fly ash as a pozzolan in concrete in the United States and elsewhere, and by Canadian specifications that classify the ashes based on their CaO content.

Current ASTM C-618 specifications include only two designations or classes of fly ash: "Class F" and "Class C" fly ashes. The "Class F" designation generally incorporates fly ashes originating from the combustion of bituminous and lignite coals and the "Class C" designation generally incorporates ashes from the combustion of subbituminous coals. These designations are based on the chemical composition of the fly ash in such a way that when the sum of the element oxides ($SiO_2+Al_2O_3+Fe_2O_3$) derived from chemical analysis of the ash is equal to or greater than 70% by weight, then the fly ash is designated a "Class F" fly ash. When the sum of the element oxides is equal to or greater than 50% by weight, the fly ash is designated as a "Class C" fly ash.

In Canada, as mentioned above, fly ashes have certain designations based on their CaO content. In particular, a fly ash is considered a "Class F" when it includes less than 8% CaO, a "Class CI" when it includes 8–20% CaO, and a "Class CH" when it includes greater than 20% CaO.

It is less commonly known that the particle-specific properties, or granulometry, of a fly ash also vary according to the source of the coal and the included mineral matter. In particular, this factor has a marked effect on the proportions of the fine and coarse particles present in the fly ash, also known as the particle size distribution, in concert with the surface area and particle packing characteristics. Significantly, these properties are not addressed by appropriate ASTM specifications, such as ASTM C-618, that cover the use of fly ash by industry.

Thus, fly ash is a chemically, physically and mineralogically complex material with properties that vary according to the source of the coal being burned in the power plant, as well as the combustion conditions and pollution control equipment installed at the power plant. An intimate knowledge of all these variables is essential to the successful use of fly ash as a mineral filler in asphaltic products such as asphalt shingles. Furthermore, it is necessary that the filled asphalt-fly ash composite meets applicable quality control specifications and ASTM performance criteria.

The present invention discloses a methodology for selecting or modifying a fly ash that will allow it to be used effectively as a substitute for the presently used crushed limestone or calcium carbonate fillers in asphalt composites. The inherent properties of fly ash, or modified fly ash, allow a more economical asphalt composite to be manufactured as well as one with superior performance.

In accordance with the invention, the inventors have discovered that the granulometry of the fly ash is important in determining whether the fly ash or a blend of the fly ash and another filler can be used to produce asphalt composites and to improve the properties of asphalt composites. In particular, a fly ash filler is selected for use in the asphalt composite having a particle size distribution with at least three modes to increase the packing factor of the fly ash filler and the mechanical properties of the asphalt composite. Alternatively, the fly ash can be blended with another fly ash or with another filler to modify the properties of the fly ash to produce a fly ash having a particle size distribution with at least three modes. Typically, the fly ash filler or filler blend has a particle size distribution with three modes but can have four, five or even more modes. In accordance with the invention, an asphalt having good compatibility with the fly ash filler or filler blends can be used to improve the mechanical properties of the asphalt composite. Moreover, a fly ash filler or filler blend having a loss on ignition (or carbon content) within a certain desirable range can be selected to provide a desirable viscosity for the filled asphalt in processing and good pliability, tear strength and tensile strength for the asphalt composite. A fly ash filler or filler blend can also be used having a high specific gravity to increase the pliability of the asphalt composite. Further, a fly ash filler or filler blend can also be used having a low oil absorption to decrease the viscosity of the filled asphalt in processing.

As mentioned above, it has been determined by the inventors that a filler having a particle size distribution with at least three modes has been found to be particularly advantageous for use with asphalt composites such as roofing shingles. Preferably, the particle size distribution has three to five modes and typically has three modes. Preferably, the particle size distribution includes a first mode having a median particle diameter from 0.3 to 1.0 microns, a second mode having a median particle diameter from 10 to 25 microns, and a third mode having a median particle diameter from 40 to 80 microns. In some cases, the filler can also include a coarse mode with a median particle diameter in the region of 100–200 microns and, in other cases, the filler can include an additional ultrafine mode with a median particle diameter in the region of 0.05–0.2 microns. The particle size distribution also preferably includes 11–17% of the particles by volume in the first mode, 56–74% of the particles by volume in the second mode, and 12–31% of the particles by volume in the third mode. Moreover, the ratio of the volume of particles in the second and third modes to the volume of particles in the first mode is preferably from about 4.5 to about 7.5. The filler also preferably has a packing factor of at least 65%, and typically has packing factors in the range of 65% to 75% and more typically in the range of 67% to 73%. The filler of the invention can advantageously be used at filler loadings of 65–70% by weight, and even greater than 70% by weight (e.g. even as high as 75% by weight). In addition, the filler of the invention can be used at filler loadings of greater than 45% by volume, greater than 50% by volume, and even as high as 55% by volume. As a result, the fillers of the invention can be used to replace significant amounts of asphalt in the asphalt composite and thus can greatly reduce the cost of the asphalt composite.

The filler used in accordance with the invention can include fly ash, calcium carbonate or a blend thereof. In addition, the filler can be a blend of two or more different fly ashes or two or more different calcium carbonates. Preferably, the filler used in accordance with the invention will be a lignite fly ash, a subbituminous ash (typically a class C ash), a bituminous ash, a blend of two or more fly ashes (e.g. a subbituminous/bituminous blend) or a blend of a fly ash and a calcium carbonate. More preferably, the filler is a lignite fly ash or a blend of a fly ash and an additional filler. These fillers have the particle size distribution and preferably the other properties discussed herein that have been found to be particularly advantageous for use with asphalt to form asphalt composites such as roofing shingles. The fly ash filler typically has a carbon content of from about 0.1% to about 15% by weight and can advantageously be selected to have a carbon content of from about 1% to about 5% by weight. It has been discovered that a carbon content greater than 5% can undesirably result in high viscosities when mixed with the asphalt and can result in a less pliable asphalt shingle. Although a filler having a carbon content less than 1% can advantageously be used with the invention, a carbon content of 1% or greater can result in an asphalt shingle having a greater tear strength and tensile strength and can be desirable. Alternatively, a lower carbon content fly ash can be used and a primarily carbon-containing filler material added as discussed in more detail below to provide a carbon content of about 1% to about 5%.

In one embodiment of the invention, the filler is a blend of a fly ash and at least one additional filler wherein the filler blend has a particle size distribution having at least three modes. The fly ash used in the filler blend can be a lignite coal fly ash, a subbituminous coal fly ash, a bituminous coal fly ash, or a blend thereof. The at least one additional filler in the filler blend is typically selected to enhance the particle size distribution or other properties of the fly ash.

In one embodiment of the invention, the additional filler in the filled blend is a fly ash. For example, the filler blend can include a high fine particle content fly ash filler such as a subbituminous coal fly ash (e.g. having a median particle size of 10 microns or less) and a low fine particle content fly ash filler such as a bituminous coal fly ash (e.g. having a median particle size of 20 microns or greater). In addition, other blends of fly ashes are possible such as bituminous/lignite, lignite/subbituminous and bituminous/lignite/subbituminous blends. In addition, two or more fly ashes from the same type of coal source, e.g., two different lignite coal fly ashes, can be blended to produce the filled blend of the invention. In the filler blends, the first fly ash can be included in an amount from about 0.1% to about 99.9%, more preferably from about 10% to about 90% by weight of the filler blend and the second fly ash can be included in an amount from about 99.9% to about 0.1%, more preferably from about 90% to about 10% by weight of the filler blend. The filler blend typically has a carbon content of from about 0.1% to about 15% by weight and can advantageously be selected to have a carbon content of from about 1% to about 5% by weight as discussed above. Although the fly ash filler blend can be produced by blending two different fly ashes, the fly ash filler blend can also be formed by burning at least two different coals selected from the group consisting of bituminous coals, lignite coals and subbituminous coals, and using the resulting ash as the filler blend. For example, a subbituminous coal and a bituminous coal can be burned together to produce the filler blend.

In another embodiment of the invention, the filler blend is a blend of a fly ash and another mineral filler such as calcium carbonate, slate dust, silica fume, and the like. In this embodiment, the filler is preferably calcium carbonate. The calcium carbonate is preferably combined with a high fine particle content fly ash filler such as a lignite or subbituminous fly ash (e.g. having a median particle size of 10 microns or less). The filler blend can include from about 0.1% to about 99.9%, more preferably about 10% to about 90% by weight of the fly ash and from about 99.9% to about 0.1%, more preferably about 90% to about 10% by weight of the calcium carbonate. The fly ash can also be selected to produce a filler blend having a carbon content of from 1% to 5% by weight as discussed above or a primarily carbon-containing material can be added to the filler blend as discussed in more detail below.

The fillers used in the invention can be classified to produce a filler having a particle size distribution with at least three modes as discussed above or one or more of the fillers used in the filler blend can be classified to allow the filler blend containing the filler to have a particle size distribution with at least three modes. For example, the fly ash fillers used alone or in the filler blends can be classified to produce the desired particle size distribution. For example, a high fine particle content fly ash such as a subbituminous coal ash or a high coarse particle content fly ash such as a bituminous coal ash can be air classified to provide the desired particle size distribution. In addition to air classification, the fly ash fillers can be classified using dry screening (sieving) or wet classification methods (e.g. wet screening or hydrocyclones) followed by drying of the fly ash. Alternatively, in-plant classification methods can be used. For example, the fly ash fillers can be classified electrostatically by adjusting the collection methods of the electrostatic precipitators used to recover the fly ash from the electric power generation plants. In addition, the fly ash fillers can be classified by modifying the discharge hopper selection of the fly ash from the electric power generation plants.

The filler and the asphalt can optionally be combined with a primarily carbon-containing material (including, e.g., 50% or more carbon by weight) to impart greater tear strength and tensile strength to the asphalt composite. The primarily carbon-containing material can be an amorphous carbon such as a carbon black, a partially graphitized carbon, or a by-product carbon or carbon concentrate from an industrial process. The primarily carbon-containing material can be added to the filler and the asphalt in an amount of about 0.1% to about 5% by weight, and in addition to the filler preferably produces a total carbon content of about 1% to about 5% by weight.

The present invention also includes a method for producing an asphalt composite that includes the steps of combining asphalt with the filler to produce a filled asphalt and producing an asphalt composite with the resulting filled asphalt. Because the asphalt is processed at an elevated temperature (e.g. 350–450° F. and typically 400–425° F.) for use in the asphalt composites, the filler is typically preheated prior to adding it to the asphalt. Advantageously, by virtue of their lower specific heats, the fly ash fillers and fly ash filler blends used in the invention can be preheated using less energy than calcium carbonate fillers and thus can be processed at a lower cost. When the filler is a filler blend, each of the fillers can be added separately to the asphalt but preferably the filler blend is prepared prior to being added to the asphalt so the fillers can be preheated together. For example, the fly ash filler and at least one additional filler can be blended together to form the filler blend prior to preheating the filler blend and combining the filler blend with the asphalt. Alternatively, a fly ash blend can be formed by burning two or more types of coal selected from the group consisting of lignite coal, subbituminous coal and bituminous coal (e.g. by burning a subbituminous coal and a bituminous coal together) and used as the filler blend for the asphalt composite.

The filled asphalt preferably has a sufficiently low viscosity to allow it to be processed to form the asphalt composite. Molten asphalt can be processed at various temperatures known in the art and is preferably processed at a temperature between 350 and 450° F. and typically between 400 and 425° F. (e.g. 400° F.). Typically, asphalt has a viscosity of about 400 centipoise at these processing temperatures. When the filler is added to asphalt, the viscosity increases. Preferably, the filled asphalt has a viscosity below a particular threshold (e.g. between 5000 and 7000 centipoise) at the desired loadings so it can be effectively processed into the asphalt composite. Preferably, the fly ash fillers and filler blends used in the invention produce a viscosity of 6000 centipoise or less at 400° F. when the fly ash filler is added at the desired loadings. For example, the filler of the invention can advantageously be used at filler loadings of 65–70% by weight, and even greater than 70% by weight (e.g. even as high as 75% by weight) to produce the desired viscosity. The filler of the invention can also be used as filler loadings of greater than 45% by volume, greater than 50% by volume, and even as high as 55% by volume, to produce the desired viscosity. As a result, the fillers of the invention can be used to replace significant amounts of asphalt in the asphalt composite and thus can greatly reduce the cost of the asphalt composite. Alternatively, the asphalt can be heated to lower temperatures to produce the desired viscosity at the same filler loadings conventionally used in asphalt composites. Thus, the thermal history of the asphalt composite can be minimized.

The filled asphalt can be prepared and the asphalt composite can be prepared from the filled asphalt by methods known in the art such as the methods described in U.S. Pat. No. 5,565,239. For example, the filled asphalt can impregnate a glass fiber mat on a moving conveyor system to produce an asphalt composite. Coating granules can then be added to the asphalt composite and the resulting asphalt composite can be allowed to cool and harden to form the roofing shingles.

The present invention will now be further demonstrated by the following non-limiting examples.

EXAMPLE 1—METHODOLOGY

The inventors have examined and compared fly ash fillers from a wide range of sources and with a wide range of compositions along with commercially available calcium carbonates typically used as fillers by the asphalt shingle industry. By way of example, the present disclosure provides information on the following materials: two commercially available sources of calcium carbonate currently used in asphalt shingle manufacture (CC01 and CC02); two fly ashes derived from bituminous coals (FA01 and FA02); three fly ashes derived from lignite coals (FA03, FA04 and FA05); and two fly ashes derived from subbituminous coals (FA06 and FA07). An additional fly ash (FA08) was included as an example of a processed fly ash. The chemical characteristics and ASTM C-618 designations of the filler materials examined are given in Table 1.

TABLE 1

| Sample ID | Sum $(SiO_2 + Al_2O_3 + Fe_2O_3)$ | ASTM C-618 Designation | Free Carbon (LOI, %) |
|---|---|---|---|
| CC01 | n/a | carbonate | |
| CC02 | n/a | carbonate | |
| FA01 | 90.2 | Class F | 2.1 |
| FA02 | 91.5 | Class F | 1.9 |
| FA03 | 81.9 | Class F | 0.2 |
| FA04 | 86.5 | Class F | 0.1 |
| FA05 | 77.9 | Class F | 0.3 |
| FA06 | 61.1 | Class C | 0.2 |
| FA07 | 55.5 | Class C | 0.5 |
| FA08 | 82.0 | Class F | 0.2 |

Examination of the powders at high magnification by scanning electron microscopy (SEM) confirmed that, as is typical of such materials, all the fly ash fillers examined were substantially spherical in particle shape. The two calcium carbonate samples were characteristically highly irregular and blocky in particle shape. The fly ash fillers had a substantially greater proportion of ultrafine particles, i.e., particles having a diameter of less than 5 microns, and had a higher surface area than the calcium carbonate samples.

The granulometry of the fillers was examined by a variety of techniques. Specific gravity (true particle density) was determined using a helium comparison pycnometer (ASTM D-2840) and by the Le Chatelier method (ASTM C-188). The particle packing factor was determined by the oil absorption method (ASTM D-281). The specific surface area was determined by the Blaine air permeability method (ASTM C-204). Analysis of the particle size distribution of the fillers was conducted using a Horiba LA-300 laser interferometer with isopropanol dispersion media. The fly ashes were obtained from power plants using pulverized coal and electrostatic or baghouse dust collection and typically had a multimodal form of particle size distribution. In particular, this was seen to take the form of a trimodal distribution with a coarse mode centered in the region of 40–80 microns, an intermediate mode centered in the region of 10–25 microns and an ultrafine mode typically centered in the region of 0.3–1.0 microns. In some cases, a fourth coarse mode was observed in the region of 100–200 microns. The multimodal distribution was conveniently analyzed into its component parts by mathematical deconvolution using a computer program such as MATLAB® from Mathworks. The laser particle size analyzer also calculated a specific surface area based on the observed distribution. The differences between the fly ashes themselves and the carbonate fillers are illustrated in Table 2 and demonstrate the differences between the specific gravity, the specific surface areas, the particle size parameters and the packing factors for the tested fillers.

TABLE 2

| Sample ID | Specific Gravity | Specific Surface Area* (cm²/g) | Median Particle Size (μm) | Finer than 5 microns (vol %) | Oil Absorption** (g/100 g) | Packing Factor** (%) |
|---|---|---|---|---|---|---|
| CC01 | 2.750 | 5,290 | 15.63 | 31.3 | 20.00 | 62.8 |
| CC02 | 2.865 | 2,050 | 25.45 | 19.4 | 17.45 | 65.0 |
| FA01 | 2.200 | 3,380 | 21.82 | 12.8 | 30.13 | 58.3 |
| FA02 | 2.290 | 3,160 | 25.22 | 12.8 | 30.13 | 57.4 |
| FA03 | 2.270 | 5,400 | 12.86 | 28.6 | 18.75 | 68.6 |
| FA04 | 2.370 | 4,850 | 15.11 | 21.4 | 15.63 | 71.5 |
| FA05 | 2.550 | 5,430 | 12.37 | 27.0 | 15.25 | 70.5 |
| FA06 | 2.760 | 6,660 | 9.46 | 39.8 | 16.25 | 67.4 |
| FA07 | 2.750 | 5,930 | 9.41 | 40.5 | 20.00 | 62.8 |
| FA08 | 2.516 | 7,690 | 2.64 | 80.2 | 25.13 | 59.5 |

*ASTM D-204
**ASTM D-281

As mentioned above, molten asphalt is typically processed at a temperature of 400–425° F. at which point the viscosity is approximately 400 centipoise and after adding the appropriate quantity of filler, the filled asphalt thickens considerably with a resulting plastic viscosity of 6000 cps or less being typical in the industry. To compare the fillers tested in the present examples, a laboratory model was established to simulate the process conditions. For convenience and precision, rheological runs were conducted at ambient temperature using an asphalt/linseed oil fluid system as a surrogate for the molten asphalt that was adjusted to provide an unfilled baseline viscosity of 400 cps. Additional analysis confirmed that the surrogate system was entirely comparable with properties of molten asphalt at a typical process temperature of 400–425° F., without the experimental problems and errors associated with handling hot asphalt.

The rheological properties of the filled asphalt fluid composites was determined using a computer controlled MC-III rheometer as described in U.S. Pat. Nos. 5,321,974 and 5,357,785. All test mixtures were examined after mixing to full dispersion before recording the stress/strain flow curves on the rheometer. Most of the fluid composites exhibited typical Bingham plastic flow at lower filler loadings, enabling the ready determination of Bingham plastic viscosity and yield stress parameters. At the higher filler loadings, many of the composites exhibited characteristic pseudoplastic flow, at which point the systems had a noticeably thicker consistency. For each filler system examined, flow curves were recorded as a function of filler loading, from which computation enabled the determination of the filler loading, expressed by weight (as Cw %) and by volume (as Cv %) required to produce a limiting composite viscosity of 6000 cps. Additional computations determined the plastic viscosity for each filled asphalt system at specific design targets, examples being 70% by weight loading (Cw=70%), 65% by weight loading (Cw=65%) and 45% by volume loading (Cv=45%). The relationships between filler loading and viscosity are provided in Table 3.

TABLE 3

| Sample ID | Cw % for 6000 cps | Cv % for 6000 cps | cps at Cw = 70% | cps at Cw = 65% | cps at Cv = 45% |
|---|---|---|---|---|---|
| CC01 | 71.6 | 47.7 | 3,303 | 2,072 | 3,800 |
| CC02 | 68.9 | 44.9 | 4,689 | 3,469 | 6,100 |
| FA01 | 63.9 | 43.7 | 19,743 | 6,640 | 8,300 |
| FA02 | 63.4 | 41.5 | 17,649 | 7,771 | 10,800 |
| FA03 | 72.6 | 54.2 | 2,559 | 1,432 | 1,600 |
| FA04 | 75.0 | 55.3 | 2,275 | 1,578 | 1,800 |

TABLE 3-continued

| Sample ID | Cw % for 6000 cps | Cv % for 6000 cps | cps at Cw = 70% | cps at Cw = 65% | cps at Cv = 45% |
|---|---|---|---|---|---|
| FA05 | 74.1 | 53.2 | 3,378 | 2,447 | 3,100 |
| FA06 | 74.3 | 49.6 | 3,970 | 3,030 | 4,800 |
| FA07 | 72.2 | 46.5 | 3,970 | 2,522 | 4,600 |
| FA08 | 63.8 | 39.8 | 10,162 | 6,628 | 7,800 |

From the forgoing, it is evident that the different filled asphalt composite systems can exhibit substantially different rheological properties as a function of both mineral filler type and filler loading. This is true not only for the fly ash fillers themselves, but also in comparing the fly ash fillers with the calcium carbonate fillers. It is immediately obvious that two of the fly ashes, FA01 and FA02, can be only be loaded to about 63–64% by weight of asphalt to reach the target composite viscosity of 6000 cps. Allowing for differences in specific gravity, this translates into a volume loading of 41.5–43.7%, somewhat less than that for the two carbonate fillers, which achieved volume loadings of 44.9–47.7%. In comparison, fly ashes FA03–FA07 can be loaded into the asphalt to a much higher degree, up to 75% by weight, before the target of 6000 cps is reached. Again, allowing for the differences in specific gravity between the materials, this translates into a volume loading that reached 55.3% in the case of FA04. This demonstrates that an optimally selected fly ash filler can be used at substantially higher loadings than the calcium carbonate fillers before excessive thickening occurs. Inspection of the data in Table 3 also shows that optimally selected fly ash fillers, such as FA03, FA04 and FA05, allow substantially higher loadings, up to 10% by volume, compared to the calcium carbonate fillers, CC01 and CC02. Higher filler loadings translate into significant cost savings in the shingle manufacturing process, most obviously in terms of savings in raw asphalt used and energy consumption.

As mentioned above, the fillers tested in this example typically possessed a trimodal particle size distribution with a coarse mode centered in the region of 40–80 microns, an intermediate mode centered in the region of 10–25 microns and an ultrafine mode typically centered in the region of 0.3–1.0 microns. The inventors have determined that the relationship between the volume percentages of the particles in each of the modes and particularly the mode ratio based on the volume of particles in modes 2 and 3 to the volume of particles in mode 1 provides a value that demonstrates the advantage of certain fillers. In particular, mode ratios in the range of 4.5–7.5 have been found to be particularly advantageous. The mode ratios for the fillers tested are provided in Table 4.

TABLE 4

| Sample ID | Mode 1 (M1) vol % | Mode 2 (M2) vol % | Mode 3 (M3) vol % | Mode Ratio (M2 + M3)/M1 |
|---|---|---|---|---|
| CC01 | 23.2 | 46.9 | 29.9 | 3.3 |
| CC02 | 14.1 | 12.4 | 73.5 | 6.1 |
| FA01 | 8.9 | 65.9 | 25.2 | 10.2 |
| FA02 | 26.6 | 67.6 | 24.5 | 11.7 |
| FA03 | 16.2 | 71.0 | 12.9 | 5.2 |
| FA04 | 11.7 | 67.4 | 20.9 | 7.5 |
| FA05 | 13.6 | 73.3 | 13.1 | 6.4 |
| FA06 | 29.7 | 57.4 | 13.0 | 2.4 |
| FA07 | 28.7 | 61.5 | 9.9 | 2.5 |
| FA08 | 16.5 | 83.5 | 0.0 | 5.1 |

It is noted that the FA06 and FA07 samples have low (M2+M3)/M1 ratios due to an excess of ultrafine particles, i.e., a lack of coarse particles. FA01 and FA02 have high ratios due to lack of fine particles, i.e., an excess of coarse particles. The FA03, FA04 and FA05 samples were found to have particularly advantageous volume loadings and included particle size distributions that included 11–17% of the particles by volume in the first mode, 67–74% of the particles by volume in the second mode, and 12–21% of the particles by volume in the third mode, to produce the desired modal ratio.

As discussed herein, the inventors have determined that the differences between the fillers are substantially ascribable to the granulometry of the fillers. One parameter that is particularly useful in this regard is the particle packing factor that shows a strong relationship to the determined plastic viscosity as is shown in Table 5.

TABLE 5

| Sample ID | Packing Factor (%) ASTM D-281 | Viscosity (cps) at Cw = 70% |
|---|---|---|
| CC01 | 62.8 | 3,303 |
| CC02 | 65.0 | 4,689 |
| FA01 | 58.3 | 19,743 |

TABLE 5-continued

| Sample ID | Packing Factor (%) ASTM D-281 | Viscosity (cps) at Cw = 70% |
|---|---|---|
| FA02 | 57.4 | 17,649 |
| FA03 | 68.6 | 2,559 |
| FA04 | 71.5 | 2,275 |
| FA05 | 70.5 | 3,378 |
| FA06 | 67.4 | 3,970 |
| FA07 | 62.8 | 3,970 |
| FA08 | 59.5 | 10,162 |

In this way, and in concert with the rheological data, it possible to compute the particle packing factor that will provide the lowest plastic viscosity at a specific filler loading design goal. The resulting limiting packing factors for various filler design loadings in the asphalt are collected in Table 6.

TABLE 6

| Filler Loading Design | Limiting Packing Factor |
|---|---|
| Cw = 65% | 61.1 |
| Cw = 70% | 64.1 |
| Cv = 45% | 62.3 |

Similar relationships can be established with the other granulometry parameters such as the particle size distribution and in particular, the modality of the particle size distribution.

The data provided in Table 5 demonstrates that two of the "Class F" fillers, FA01 and FA02, have very high composite plastic viscosity at the nominal loading of Cw=70%. At the same time, these two fillers have the lowest packing factors in the group. The processed fly ash, FA08, also a "Class F" fly ash according to the ASTM definition, similarly has a low packing factor and a high composite plastic viscosity. The other "Class F" fillers, FA03, FA04 and FA05, all have high packing factors and correspondingly low composite plastic viscosities. Furthermore, the inventors have shown clearly that the two ASTM "Class C" fly ashes, FA06 and FA07, can function perfectly well as fillers, as evidenced by their packing factor and plastic viscosity. Accordingly, the chemical definition of an acceptable fly ash filler, as set forth by the "Class F" ASTM C-618 designation used in U.S. Pat. No. 5,565,239 is not sufficient for the selection of mineral fillers for use in asphalt composites.

The physical properties of hardened filled asphalt composites show the superior performance of the fly ash fillers used in accordance with the present invention. This is illustrated by the tensile and tear strength data for filled asphalt composites with variable 10 loading on a weight basis (Table 7), variable loading on a volume basis (Table 8) and a loading corresponding to a plastic viscosity of 6000 cps (Table 9), for CC02, FA01, FA03 and FA06.

TABLE 7

| Sample ID | Filler Content by Weight Cw % | Tensile Load (lb) | Tear Strength (N) |
|---|---|---|---|
| CC02 | 67.0 | 5.58 | 59.34 |
|  | 70.0 | 7.98 | 72.75 |
|  | 73.0 | 9.57 | 76.10 |
| FA01 | 67.0 | 14.84 | 82.23 |
|  | 70.0 | 16.34 | 79.43 |
|  | 73.0 | 16.08 | 87.56 |

TABLE 7-continued

| Sample ID | Filler Content by Weight Cw % | Tensile Load (lb) | Tear Strength (N) |
|---|---|---|---|
| FA03 | 67.0 | 8.45 | 67.39 |
| | 70.0 | 12.18 | 69.63 |
| | 73.0 | 10.81 | 82.95 |
| FA06 | 67.0 | 7.89 | 74.13 |
| | 70.0 | 9.03 | 62.72 |
| | 73.0 | 11.24 | 72.22 |

TABLE 8

| Sample ID | Filler Content by Volume Cv % | Tensile Load (lb) | Tear Strength (N) |
|---|---|---|---|
| CC02 | 45.0 | 8.62 | 75.94 |
| | 50.0 | 10.12 | 63.49 |
| | 55.0 | 9.95 | 76.40 |
| FA01 | 45.0 | 14.46 | 87.53 |
| | 50.0 | 16.30 | 88.44 |
| | 55.0 | 16.08 | 87.56 |
| FA03 | 45.0 | 5.58 | 62.53 |
| | 50.0 | 10.50 | 71.88 |
| | 55.0 | 10.81 | 82.95 |
| FA06 | 45.0 | 8.85 | 91.60 |
| | 50.0 | 11.24 | 72.22 |
| | 55.0 | 15.50 | 74.59 |

TABLE 9

| Sample ID | Filler Content Weight Cw % | Filler Content Volume Cv % | Tensile Load (lb) | Tensile Strength (N) |
|---|---|---|---|---|
| CC02 | 70.0 | 45.4 | 7.98 | 72.75 |
| FA01 | 63.9 | 44.3 | 14.90 | 96.53 |
| FA03 | 72.6 | 54.4 | 10.70 | 78.32 |
| FA06 | 74.3 | 51.7 | 12.00 | 79.09 |

At a given filler loading factor, the fly ash fillers were generally better than or at least comparable with the calcium carbonate fillers. The tensile data mostly trend upwards with filler loading whereas the tear data are generally more scattered with loading. Tear and tensile strengths at filler loadings corresponding to 6000 cps in the fluid state strongly favor fly ash fillers FA03 and FA06 which have physical properties better than the carbonate filler at significantly higher filler loadings. Fly ash FA01 has the best tear and tensile properties of the group although it is has a low packing factor and a high viscosity, being only workable up to Cw=64%. It is believed that the improved tear and tensile properties of the FA01 fly ash can be attributed to the higher carbon content in this fly ash compared to the other fly ashes tested. FA03 also performs very well in tear at Cw=73% (Cv=54.9%) and FA06 performs very well in the tensile test at Cw=76.8% (Cv=55.0%).

EXAMPLE 2 MODIFICATION OF GRANULOMETRY OF FLY ASH TO IMPROVE FILLER CHARACTERISTICS

As a further illustration of the broader application of the concepts disclosed in the present invention, the inventors have demonstrated that it is possible to modify the granulometry of a fly ash through processing and/or blending in such a way that its characteristics as a mineral filler are markedly enhanced.

As an example, it will be recalled from Example 1 that fly ash FA01, designated as an ASTM "Class F" ash, does not function satisfactorily as an asphalt filler as a result of a sub-optimal granulometry, whereby the particle packing factor is low (58.3%) and the composite plastic viscosity is very high (12,123 cps) at a loading of 70% by weight. Further examination by scanning electron microscopy revealed that fly ash FA01 has a relatively low population of ultrafine particles leading to a low specific surface area of 3,380 $cm^2/g$. A series of experiments was carried out where additional fine particulate material was added to FA01 using the fine processed ash FA08 with a specific surface area of 7,690 $cm^2/g$. At each addition level, the granulometry of the resulting filler blend was measured and the rheological characteristics determined using the MC-III rheometer at a nominal fixed filler content of 70% by weight. Granulometry and Theological data for the blended fillers produced with various proportions of fly ashes FA01 and FA08 are summarized in Table 10.

TABLE 10

| Sample | Specific Surface ($cm^2/g$) | Packing Factor (%) | Viscosity (cps) at Cw = 70% |
|---|---|---|---|
| 100% FA01 | 3380 | 58.3 | 12,123 |
| 90:10 FA01/FA08 | 3374 | 59.9 | 8,765 |
| 80:20 FA01/FA08 | 3759 | 60.8 | 6,651 |
| 70:30 FA01/FA08 | 4125 | 68.2 | 5,590 |
| 60:40 FA01/FA08 | 4409 | 67.9 | 5,353 |

From inspection of the results in Table 10, it is evident that as the proportion of the fine particulate fly ash FA08 increases from 0–40% by weight in the blend, both the specific surface area and the particle packing factor increase monotonically. This is accompanied by a corresponding marked, and substantially linear, decrease in the composite plastic viscosity from over 12,000 cps to a pessimum value of 5,353 cps at a 40% by weight content of fly ash FA08. This illustrates the synergistic benefits of the blending or modifying of fly ashes in accordance with the present invention, especially when it is considered that the composite plastic viscosity of the fine fly ash FA08 by itself is 10,162 cps at a filler content of 70% by weight. It is convenient to consider that, initially, the addition of fine particles in fly ash FA08 compensates for the deficiency of fine particles in fly ash FA01, thereby improving the packing. This proceeds up to a certain addition level, or pessimum, at which point the system develops an excess of fine particles or deficiency of coarse particles, with a consequent reduction in the packing efficiency.

As a second example, alternative modification of the granulometry of fly ash FA01 was carried using progressively increasing proportions of fly ash FA06, an ASTM "Class C" ash with an inherently higher content of fine particles, as shown by its specific surface area of 4,026 $cm^2/g$. As clearly shown by the data in Table 11, there was again a progressive, and substantially linear, increase in both the specific surface area and particle packing factor of the blended filler up to approximately 60% by weight of fly ash FA06. This was again accompanied by a marked reduction in the composite plastic viscosity from an initial value of 7,766 cps for the 100% FA01 down to a pessimum value of 2,206 cps for a 40:60 by weight blend of fly ashes FA01 and FA06. As in the previous example, the addition of the fine "Class C" fly ash FA06 increased the proportion of fine particles in the fly ash FA01 up to a point, occurring around 60% by weight of fly ash FA06, a point above which the system began to be deficient in coarse particles, with a consequent reduction in packing efficiency.

TABLE 11

| Sample | Specific Surface (cm²/g) | Packing Factor (%) | Viscosity (cps) at Cw = 70% |
|---|---|---|---|
| 100% FA01 | 2,929 | 61.6 | 7,766 |
| 80:20 FA01/FA06 | 2,862 | 63.0 | 5,315 |
| 60:40 FA01/FA06 | 3,176 | 65.9 | 3,780 |
| 40:60 FA01/FA06 | 3,487 | 68.0 | 2,206 |
| 20:80 FA01/FA06 | 4,026 | 69.5 | 4,931 |

These modifications to the granulometry of a fly ash provide a number of significant advantages to its successful use as a mineral filler in asphalt, including: (i) increased mineral filler loadings at a given composite viscosity, resulting in cost savings through reduced asphalt consumption and reduced energy requirements; (ii) potentially unusable or uneconomic fly ash fillers could be made viable, thereby improving economics and reducing the environmental impact of fly ash that would otherwise require disposal; (iii) reduced viscosity at a given mineral filler loading, with the benefit that energy savings would accrue through lower energy consumption to heat the asphalt; (iv) an expected improvement in the composite properties and durability; and (v) improved manufacturing economics.

EXAMPLE 3 MODIFYING THE GRANULOMETRY OF CALCIUM CARBONATE WITH FLY ASH TO IMPROVE FILLER CHARACTERISTICS

As discussed herein, ground limestone or calcium carbonate is the mineral filler conventionally used in asphalt shingles and related asphalt composites. Because of the irregular particle size and poor particle packing properties of calcium carbonate fillers, commercially available calcium carbonate fillers are typically limited to about a 65% by weight loading during the asphalt shingle manufacturing process.

In another illustration of the broader application of the technology, the inventors have shown that it is possible to markedly improve the filler characteristics of commercial calcium carbonates by modifying their granulometry by blending the calcium carbonate fillers with certain selected fly ashes.

By way of example, the inventors have selected a typical commercial calcium carbonate, CC02, currently used in asphalt shingle manufacture and having a low specific surface area and a deficiency of fine particles. As discussed earlier, rheological examination of this carbonate showed that it would reach a composite plastic viscosity of 6,000 cps at a loading of 68.9% by weight, corresponding to 44.9% by volume. Modification of the granulometry of carbonate CC02 was carried out by blending in progressive increments of fly ash FA06, an ASTM "Class C" ash. Inspection of the data in Table 12 shows that with increasing amounts of the blend ash FA06, there was a marked beneficial increase in the packing factor from 65% to over 70%. At the same time, the plastic composite viscosity decreased from 4,647 cps for the 100% CC02 material down to 3,112 cps for a 50:50 by weight blend of carbonate CC02 with fly ash FA06. With this kind of improvement in filler efficiency in the modified blend, the filler loading can be readily increased to 70–73% by weight, or more, before a composite viscosity of 6,000 cps is reached.

TABLE 12

| Sample | Specific Surface (cm²/g) | Packing Factor (%) | Viscosity (cps) at Cw = 70% |
|---|---|---|---|
| 100% CC02 | 2050 | 65.0 | 4,647 |
| 80:20 CC02/FA06 | 2063 | 69.9 | 3,895 |
| 60:40 CC02/FA06 | 2872 | 70.2 | 3,492 |
| 50:50 CC02/FA06 |  |  | 3,112 |
| 100% FA06 | 6660 | 67.4 | 4,775 |

Calcium carbonate/fly ash blends can contain up to 50 wt % or more fly ash, ideally selected from ashes that possess a substantially greater proportion of ultrafine particles compared with the original calcium carbonate. These can include ASTM "Class F" and "Class C" fly ashes derived from the combustion of bituminous, lignite and subbituminous coals, and in more specific ideal cases from lignite and subbituminous coals. Alternatively, a coarse calcium carbonate can serve to increase the coarse particle content of a fly ash filler that is deficient in coarse particles. It is believed that filled asphalt composites made with calcium carbonate/fly ash blends will have improved physical properties, such as tear and tensile strength.

As mentioned above, the mode ratio for the fillers has been found to be a particularly useful parameter in determining whether the fillers will have the desired packing factor and will provide good filler properties in the asphalt composite. The mode ratios for the preferred filler blends discussed in Examples 2 and 3 are provided in Table 13 and fall within the desired range of 4.5 to 7.5.

TABLE 13

| Sample ID | Mode 1 (M1) vol % | Mode 2 (M2) vol % | Mode 3 (M3) vol % | Mode Ratio (M2 + M3/M1) |
|---|---|---|---|---|
| 60:40 FA01/FA08 | 15.8 | 66.2 | 18.0 | 5.3 |
| 40:60 FA01/FA06 | 16.4 | 61.7 | 22.0 | 5.1 |
| 60:40 CC02/FA06 | 17.7 | 37.7 | 44.6 | 4.7 |

As shown in the above examples, the fly ash fillers and filler blends used in accordance with the invention allow high filler loadings at the viscosities and temperatures conventionally used to make asphalt shingles and provide superior properties such as tear strength and tensile strength compared to commercially available calcium carbonate fillers. In addition, the fly ash fillers and filler blends of the present invention produce asphalt shingles having superior pliability compared to commercially available calcium carbonate fillers. As would be understood to those skilled in the art, pliability can be measured by bending a test bar or coupon 90° around a ¾" radius block or pipe at 72° F. and 40° F. The sample passes if a crack ≧⅛" does not appear. The quality control standard requires that 66% of the bars pass the pliability test. Although U.S. Pat. No. 5,565,239 states that an asphalt shingle made with a Class F fly ash possesses greater pliability than a shingle filled with calcium carbonate at the same loading, the inventors have found that this is not true of Class F ashes generally and that the fly ash must have a beneficial granulometry to provide pliability superior to that resulting from using commercially available calcium carbonate fillers. Moreover, the fly ash fillers and filler blends of the invention improve the weatherability of the asphalt composites. In particular, based on ASTM D-2565 tests of asphalt composites prepared using the fly ash fillers of the invention and conventional calcium carbonate fillers, it was observed that the asphalt composites prepared using the fly ash fillers had comparatively smoother surfaces than the asphalt composites prepared using calcium carbonate fillers.

As discussed above, the inventors have found that a filler having a particle size distribution with at least three modes exhibits improved rheology and can be used at higher loadings to provide an asphalt shingle having superior tear strength. Specifically, a particle size distribution with three modes is believed by the inventors to give optimum packing density and to produce an asphalt composite having the improved mechanical properties mentioned above. In addition, the inventors have determined that having a filler with a higher specific gravity at the same filler loading by weight results in increased pliability. The inventors have also determined that the loss on ignition (primarily the amount of unburned carbon) should preferably be within a certain range in that as loss on ignition increases, viscosity also increases and pliability decreases. However, the inventors have also determined that the presence of unburned carbon can result in increased tear strength and tensile strength so an intermediate carbon content level, e.g., 1–5%, is preferably selected. The inventors have also determined that lower fineness values (wherein fineness relates to the percentage of particles having a particle size less than 45 microns) correlates with reduced viscosity and improved pliability. The inventors have also determined that higher loose bulk density values, which indicate good packing, a low void volume and an even particle size distribution, result in an asphalt composite that is more pliable and less viscous. The inventors further believe that superior mechanical properties can also be achieved with asphalts that are more compatible with fly ash.

It is understood that upon reading the above description of the present invention, one skilled in the art could make changes and variations therefrom. These changes and variations are included in the spirit and scope of the following appended claims.

That which is claimed:

1. An asphalt composite comprising asphalt and a filler, said filler comprising a blend of a fly ash and at least one other filler wherein the filler blend has a particle size distribution having at least three modes.

2. The asphalt composite according to claim 1, wherein the particle size distribution includes a first mode having a median particle diameter from 0.3 to 1.0 microns, a second mode having a median particle diameter from 10 to 25 microns, and a third mode having a median particle diameter from 40 to 80 microns.

3. The asphalt composite according to claim 1, wherein the at least one additional filler in the filler blend is a second fly ash.

4. The asphalt composite according to claim 3, wherein the filler blend comprises a high fine particle content fly ash filler and a low fine particle content fly ash filler.

5. The asphalt composite according to claim 1, wherein the at least one additional filler in the filler blend is a calcium carbonate filler.

6. An asphalt composite comprising asphalt and a subbituminous coal fly ash filler, wherein the subbituminous coal fly ash filler has a particle size distribution having at least three modes.

7. The asphalt composite according to claim 6, wherein the particle size distribution includes a first mode having a median particle diameter from 0.3 to 1.0 microns, a second mode having a median particle diameter from 10 to 25 microns, and a third mode having a median particle diameter from 40 to 80 microns.

8. The asphalt composite according to claim 6, wherein the subbituminous fly ash is a Class C fly ash.

9. An asphalt composite comprising asphalt and a filler having a particle size distribution with at least three modes, the filler comprising fly ash and having a loading of greater than 70% by weight.

10. The asphalt composite according to claim 9, wherein the particle size distribution has three modes.

11. The asphalt composite according to claim 9, wherein the particle size distribution includes a first mode having a median particle diameter from 0.3 to 1.0 microns, a second mode having a median particle diameter from 10 to 25 microns, and a third mode having a median particle diameter from 40 to 80 microns.

12. The asphalt composite according to claim 9, wherein the fly ash is a lignite coal fly ash.

13. The asphalt composite according to claim 9, wherein the fly ash is a subbituminous coal fly ash.

14. The asphalt composite according to claim 9, wherein the filler further includes a second fly ash.

15. The asphalt composite according to claim 9, wherein the filler further comprises calcium carbonate.

16. An asphalt composite comprising asphalt, a filler and a primarily carbon containing material, wherein the filler has a particle size distribution having at least three modes.

17. The asphalt composite according to claim 16, wherein the filler includes a fly ash.

18. The asphalt composite according to claim 17, wherein the fly ash is a lignite coal fly ash.

19. The asphalt composite according to claim 17, wherein the fly ash is a subbituminous coal fly ash.

20. The asphalt composite according to claim 17, wherein the filler further includes a second fly ash.

21. The asphalt composite according to claim 17, wherein the filler further includes calcium carbonate.

22. The asphalt composite according to claim 16, wherein the filler includes calcium carbonate.

23. The asphalt composite according to claim 16, wherein the primarily carbon-containing material is present in the asphalt composite in an amount from about 0.1% to about 5% by weight.

24. An asphalt composite comprising asphalt and a calcium carbonate filler, wherein the calcium carbonate filler has a particle size distribution having at least three modes.

25. A filler for an asphalt composite comprising a blend of fly ash and at least one additional filler wherein the filler blend has a particle size distribution having at least three modes.

26. The filler according to claim 25, wherein the particle size distribution includes a first mode having a median particle diameter from 0.3 to 1.0 microns, a second mode having a median particle diameter from 10 to 25 microns, and a third mode having a median particle diameter from 40 to 80 microns.

27. The filler according to claim 25, wherein the at least one additional filler in the filler blend is a second fly ash.

28. The filler according to claim 27, wherein the filler blend comprises a high fine particle content fly ash filler and a low fine particle content fly ash filler.

29. The filler according to claim 25, wherein the at least one additional filler in the filler blend is a calcium carbonate filler.

30. A filler for an asphalt composite comprising asphalt and a subbituminous coal fly ash filler, wherein the subbituminous coal fly ash filler has a particle size distribution having at least three modes.

31. The filler according to claim 30, wherein the particle size distribution includes a first mode having a median particle diameter from 0.3 to 1.0 microns, a second mode having a median particle diameter from 10 to 25 microns, and a third mode having a median particle diameter from 40 to 80 microns.

32. The filler according to claim 30, wherein the subbituminous coal fly ash is a Class C fly ash.

33. A method for producing an asphalt composite, comprising the steps of:

combining asphalt with a fly ash and at least one additional filler, the fly ash and at least one other filler together producing a filler blend having a particle size distribution having at least three modes; and producing an asphalt composite with the resulting filled asphalt.

34. The method according to claim 33, further comprising the step of blending the fly ash and the at least one additional filler together to produce a filler blend prior to said combining step.

35. The method according to claim 34, wherein the blending step comprises blending the fly ash filler and the at least one additional filler together to produce a filler blend having a particle size distribution wherein the particle size distribution includes a first mode having a median particle diameter from 0.3 to 1.0 microns, a second mode having a median particle diameter from 10 to 25 microns, and a third mode having a median particle diameter from 40 to 80 microns.

36. The method according to claim 34, wherein the blending step comprises blending a first fly ash and a second fly ash.

37. The method according to claim 36, wherein the blending step comprises blending a high fine particle content fly ash and a low fine particle content fly ash.

38. The method according to claim 34, wherein the blending step comprises blending a fly ash and a calcium carbonate.

39. The method according to claim 33, wherein the combining step comprises combining asphalt with a fly ash blend formed by burning two or more types of coal selected from the group consisting of lignite coal, subbituminous coal and bituminous coal.

40. A method for producing an asphalt composite, comprising the steps of:
    combining asphalt with a subbituminous coal fly ash filler having a particle size distribution with at least three modes; and
    producing an asphalt composite with the resulting filled asphalt.

41. The method according to claim 40, wherein the combining step comprises combining asphalt with a fly ash filler having a particle size distribution wherein the particle size distribution includes a first mode having a median particle diameter from 0.3 to 1.0 microns, a second mode having a median particle diameter from 10 to 25 microns, and a third mode having a median particle diameter from 40 to 80 microns.

42. The method according to claim 40, wherein the combining step comprises combining asphalt with a subbituminous coal fly ash filler, wherein the subbituminous coal fly ash filler is a Class C fly ash filler.

43. A method for producing an asphalt composite, comprising the steps of:
    combining asphalt with a filler at a filler loading of greater than 70% by weight, then filler having a particle size distribution with at least three modes and comprising fly ash, and
    producing an asphalt composite with the resulting filled asphalt.

44. The method according to claim 43, wherein the particle size distribution includes a first mode having a median particle diameter from 0.3 to 1.0 microns, a second mode having a median particle diameter from 10 to 25 microns, and a third mode having a median particle diameter from 40 to 80 microns.

45. The method according to claim 43, wherein the fly ash is a lignite coal fly ash.

46. The method according to claim 43, wherein the fly ash is a subbituminous coal fly ash.

47. The method according to claim 43, wherein the filler further includes a second fly ash.

48. The method according to claim 43, wherein the filler comprises a high fine particle content fly ash and a low fine particle content fly ash.

49. The method according to claim 43, wherein the filler further comprises calcium carbonate.

50. A method for producing an asphalt composite, comprising the steps of: combining asphalt with a filler and a primarily carbon-containing material; and producing an asphalt composite with the resulting filled asphalt, wherein the filler has a particle size distribution having at least three modes.

51. The method according to claim 50, wherein the filler includes a fly ash.

52. The method according to claim 51, wherein the fly ash is a lignite coal fly ash.

53. The method according to claim 51, wherein the fly ash is a subbituminous coal fly ash.

54. The method according to claim 51, wherein the filler further includes a second fly ash.

55. The method according to claim 51, wherein the filler further includes calcium carbonate.

56. The method according to claim 50, wherein the filler includes calcium carbonate.

57. The method according to claim 50, wherein the primarily carbon-containing material is present in the asphalt composite in an amount from about 0.1% to about 5% by weight.

58. A method for producing an asphalt composite, comprising the steps of:
    combining asphalt with a calcium carbonate filler having a particle size distribution having at least three modes; and
    producing an asphalt composite with the resulting filled asphalt.

59. A method for producing an asphalt composite, comprising the steps of:
    classifying a fly ash to produce a fly ash having a particle size distribution having at least three modes;
    combining the fly ash with asphalt to produce a filled asphalt; and
    producing an asphalt composite with the filled asphalt.

60. The method according to claim 59, wherein the classifying step comprises classifying the fly ash to produce a fly ash having a particle size distribution that includes a first mode having a median particle diameter from 0.3 to 1.0 microns, a second mode having a median particle diameter from 10 to 25 microns, and a third mode having a median particle diameter from 40 to 80 microns.

61. The method according to claim 59, wherein the combining step comprises combining the fly ash and at least one additional filler with asphalt to produce a filled asphalt.

62. The method according to claim 61, further comprising the step of blending the fly ash and the at least one additional filler together to produce a filler blend prior to said combining step.

63. The method according to claim 59, wherein the classifying step comprises air classifying the fly ash to produce a fly ash having a particle size distribution having at least three modes.

64. A method for producing an asphalt composite, comprising the step of selecting a fly ash filler for use in the asphalt composite or modifying a fly ash filler for use in the asphalt composite to have a particle size distribution with at least three modes to increase the packing factor of the fly ash filler and to improve the mechanical properties of the asphalt composite.

65. The method according to claim 64, wherein the selecting or modifying step comprises selecting or modifying a fly ash filler to have a particle size distribution with three modes.

66. The method according to claim 64, wherein the selecting or modifying step comprises selecting an asphalt that has good compatibility with the fly ash filler to improve the mechanical properties of the asphalt composite.

* * * * *